United States Patent [19]
Hirata et al.

[11] Patent Number: 4,512,413
[45] Date of Patent: Apr. 23, 1985

[54] ROTARY CULTIVATING APPARATUS OF LATERALLY SHIFTABLE TYPE

[75] Inventors: Mitsuki Hirata; Yoshitaka Sato; Kaname Matudaira, all of Sakai, Japan

[73] Assignee: Kubota Ltd., Osaka, Japan

[21] Appl. No.: 386,319

[22] Filed: Jun. 8, 1982

[30] Foreign Application Priority Data

Aug. 28, 1981 [JP] Japan .................. 56-135738

[51] Int. Cl.³ .................. A01B 33/08; A01B 33/02
[52] U.S. Cl. .................. 172/74; 172/476; 172/125; 172/47; 172/98; 74/354
[58] Field of Search .................. 172/76, 78, 74, 98, 172/123, 125, 476, 667; 74/354

[56] References Cited

U.S. PATENT DOCUMENTS

| | | | |
|---|---|---|---|
| 1,040,990 | 10/1912 | Avary | 172/476 |
| 1,903,991 | 4/1933 | Fowler | 172/98 |
| 2,034,779 | 3/1936 | Storey | 172/74 |
| 2,049,661 | 8/1936 | Pedersen | 74/354 |
| 2,765,719 | 10/1956 | Day et al. | 172/76 |
| 2,935,139 | 5/1960 | Dede | 172/667 X |

FOREIGN PATENT DOCUMENTS

| | | | |
|---|---|---|---|
| 214512 | 12/1954 | Australia | 172/74 |
| 55-106003 | 7/1980 | Japan | 172/98 |
| 55-106004 | 7/1980 | Japan | 172/98 |
| 55-106005 | 7/1980 | Japan | 172/98 |

*Primary Examiner*—Richard J. Johnson
*Attorney, Agent, or Firm*—Armstrong, Nikaido, Marmelstein & Kubovcik

[57] ABSTRACT

A rotary cultivating apparatus wherein a tiller frame having a rotary tiller unit is laterally shiftable relative to a fixed frame having connecting portions for a vehicle and a power input shaft. A mechanism for laterally shifting the tiller frame comprises a transmission gear member mounted on a transmission shaft for the tiller unit and having an inner gear and an outer gear, a shifting screw rod reversibly rotatable by the transmission gear member through intermediate gears, and an internally threaded member fixed to tiller frame and in screw-thread engagement with the screw rod. One of the intermediate gears is selectively meshable with the transmission gear member to shift the tiller frame laterally in either direction by utilizing the power for driving the tine shaft of the tiller unit.

9 Claims, 23 Drawing Figures

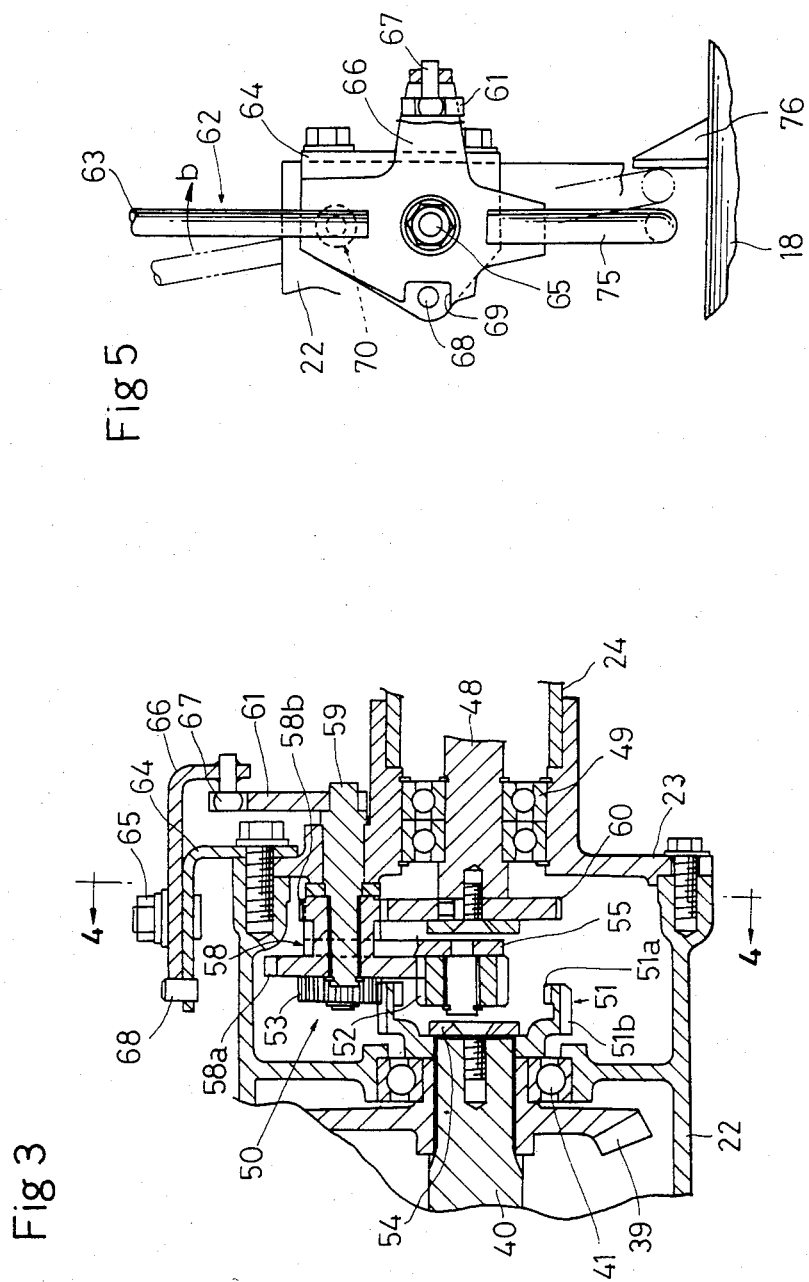

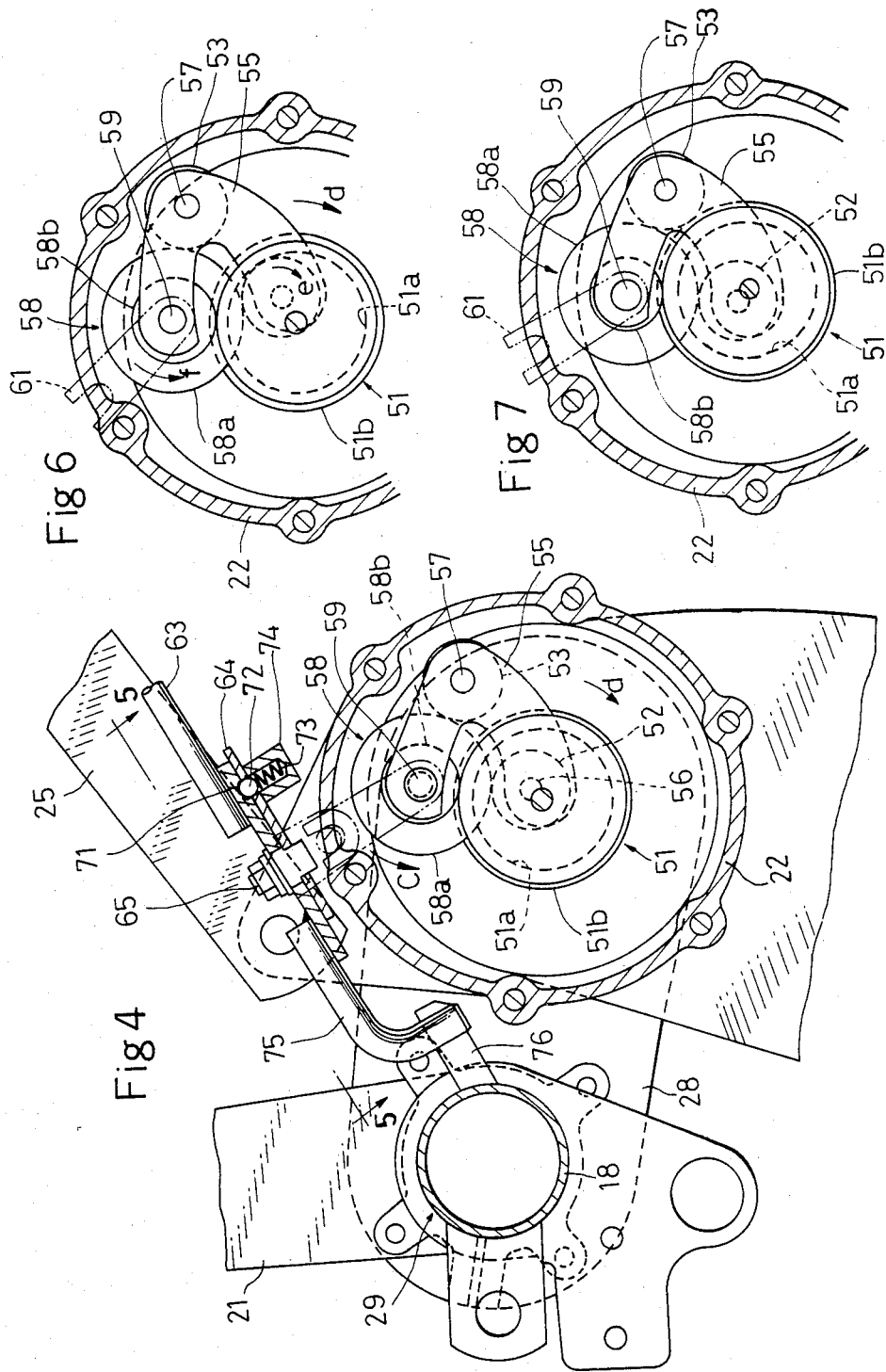

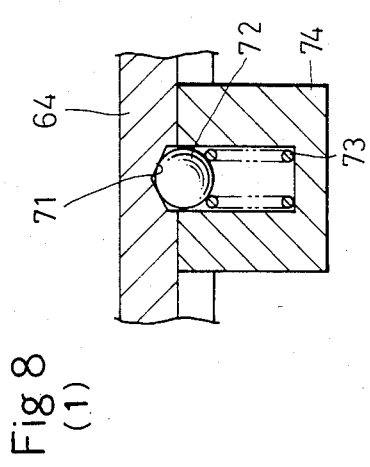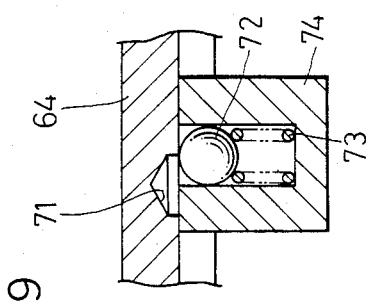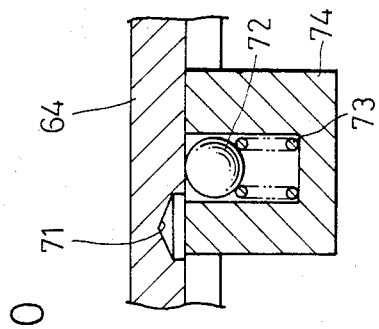

ROTARY CULTIVATING APPARATUS OF LATERALLY SHIFTABLE TYPE

BACKGROUND OF THE INVENTION

The present invention relates to a rotary cultivator, and more particularly to a rotary cultivating apparatus of the laterally shiftable type comprising a tiller unit which is shiftable from tandem position to offset position and vice versa relative to a vehicle to which the apparatus is attached.

When a rotary cultivating apparatus is attached to a tractor or like vehicle for cultivation, the apparatus is usually positioned tandem relative to the vehicle as aligned therewith.

For cultivating a wet paddy field, for example, strakes, supplementary wheels or like running assisting means are attached to the vehicle, so that the cultivating apparatus, if connected tandem to the vehicle, is unable to fully cultivate the soil close to a boundary or ridge due to the presence of the assisting means. Further even when such assisting means are not used, the apparatus in a tandem arrangement sometimes fails to cultivate fully close to ridges.

Accordingly various rotary cultivating apparatus have been provided which comprise a rotary tiller unit laterally shiftable to an offset position relative to the tractor to which the apparatus is attached when cultivating the soil close to a boundary or bordering ridge. Such apparatus are very convenient because the soil can be cultivated completely close to the ridge and the area close the ridge can be subsequently treated easily. Rotary cultivating apparatus of this type include those of the slidable type which comprise a fixed frame having connecting portions for a tractor and an input gear case, a pair of opposite tubular support members attached to the fixed frame, a tiller frame having a rotary tiller unit and supported by the support members laterally shiftably, a transmission shaft inserted in one of the support members for transmitting power from a power input shaft to a tine shaft, and a shifting mechanism mounted on the other support member for laterally sliding the tiller frame relative to the fixed frame. The tiller frame (rotary tiller unit) is laterally slidable easily by operating the shifting mechanism after lifting the rotary cultivating apparatus, so that the apparatus has the advantage of being easier to handle for offsetting than those of the type wherein the connecting means of the apparatus for the tractor is replaced for offsetting. However, the conventional shifting mechanism, which comprises a hydraulic cylinder incorporated in the support member, requires a hydraulic piping system which includes control valves, etc., as well as seal means which must be prepared with accuracy. The apparatus therefore has the problem that it is very costly to manufacture.

The apparatus is further inconvenient to handle in that the means for changing the direction of lateral sliding movement of the tiller frame must be operated with a considerable force.

SUMMARY OF THE INVENTION

An object of the present invention is to provide a rotary cultivating apparatus of the laterally shiftable type which comprises a gear transmission mechanism housed in an input gear case and including a power input shaft and a transmission shaft for transmitting power from the input shaft to a rotary tiller unit, i.e. to a tine shaft, and a laterally shifting mechanism including a shifting screw rod coupled by change means to the transmission shaft and thereby rotatable in a positive or reverse direction selectively to laterally shift a tiller frame having the rotary tiller unit, the tiller unit thus being laterally shiftable by the use of power for driving the tine shaft so as to render the apparatus simpler in construction and less costly than the conventional hydraulic cylinder type.

Another object of the invention is to provide a rotary cultivating apparatus of the type described wherein the change means comprises a transmission gear member mounted on the transmission shaft and having an inner gear and an outer gear, and a pair of intermediate gears supported by a pivotal arm and selectively meshable with the inner gear and the outer gear respectively, the change means thus being made compact in construction.

Anothe object of the invention is to provide a rotary cultivating apparatus of the type described wherein the tiller frame is provided with a pair of opposite restraining members for forcibly returning the change means to its neutral position to stop the rotary tiller unit when the tiller unit has been laterally moved by a predetermined amount, whereby the tiller unit is made laterally shiftable with safety without malfunctioning.

Another object of the invention is to provide a rotary cultivating apparatus of the type described wherein change control means for the change means is provided with positioning means for holding a change lever in a neutral position, positive rotation position and reverse rotation position, the lever holding force of the positioning means being smaller in the neutral position than in the rotation positions so as to render the change means controllable easily with a reduced force.

Another object of the invention is to provide a rotary cultivating apparatus of the type described wherein a pair of tubular support members extending from the opposite sides of the input gear case each comprise divided segments which are connected together as axially aligned and are therefore easy to make accurately in a circular form, the tiller frame including a slide frame in parallel with the tubular support members and therefore being rendered laterally shiftable accurately without distortion.

Still another object of the invention is to provide a rotary cultivating apparatus of the type described wherein a support arm extending from each of the tubular support members toward the slide frame has a plurality of rolling members each of which is supported by a bracket on the support arm and is rollable in contact with the outer surface of the slide frame, at least one of the support bracket and each rolling member being made of an elastic or resilient material, whereby the tiller frame is made laterally shiftable with minimized resistance while the impact to be exerted on the tiller frame can be mitigated.

Other advantages and features of the invention will become apparent from the following description with reference to the accompanying drawings.

BRIEF DESCRIPTION OF THE DRAWINGS

FIGS. 1 to 7 show a first embodiment of the invention;

FIG. 1 is a side elevation partly broken away;

FIG. 2 is a fragmentary plan view in section and partly in development;

FIG. 3 is an enlarged sectional view showing change means;

FIG. 4 is a view in section taken along the line 4—4 in FIG. 3;

FIG. 5 is a view showing change control means as it is seen along the line 5—5 in FIG. 4;

FIG. 6 and FIG. 7 are sectional views showing the operation of the change means;

FIGS. 8 (1) to (3), FIGS. 9 (1) to (3) and FIGS. 10 (1) to (3) are fragmentary diagrams illustrating the operation of change lever positioning means for the change control means;

FIG. 11 is a fragmentary plan view in section and partly in development;

FIG. 12 is an enlarged view in section showing change means;

FIG. 13 is a view in section taken along the line 13—13 in FIG. 12;

FIG. 14 is a view showing change control means as it is seen along the line 14—14 in FIG. 13;

FIG. 15 is an enlarged sectional view of FIG. 14;

FIG. 16 is a detailed sectional view showing sliding guide means; and

FIG. 17 is a fragmentary enlarged plan view of FIG. 16.

DETAILED DESCRIPTION OF THE INVENTION

Figure 1:
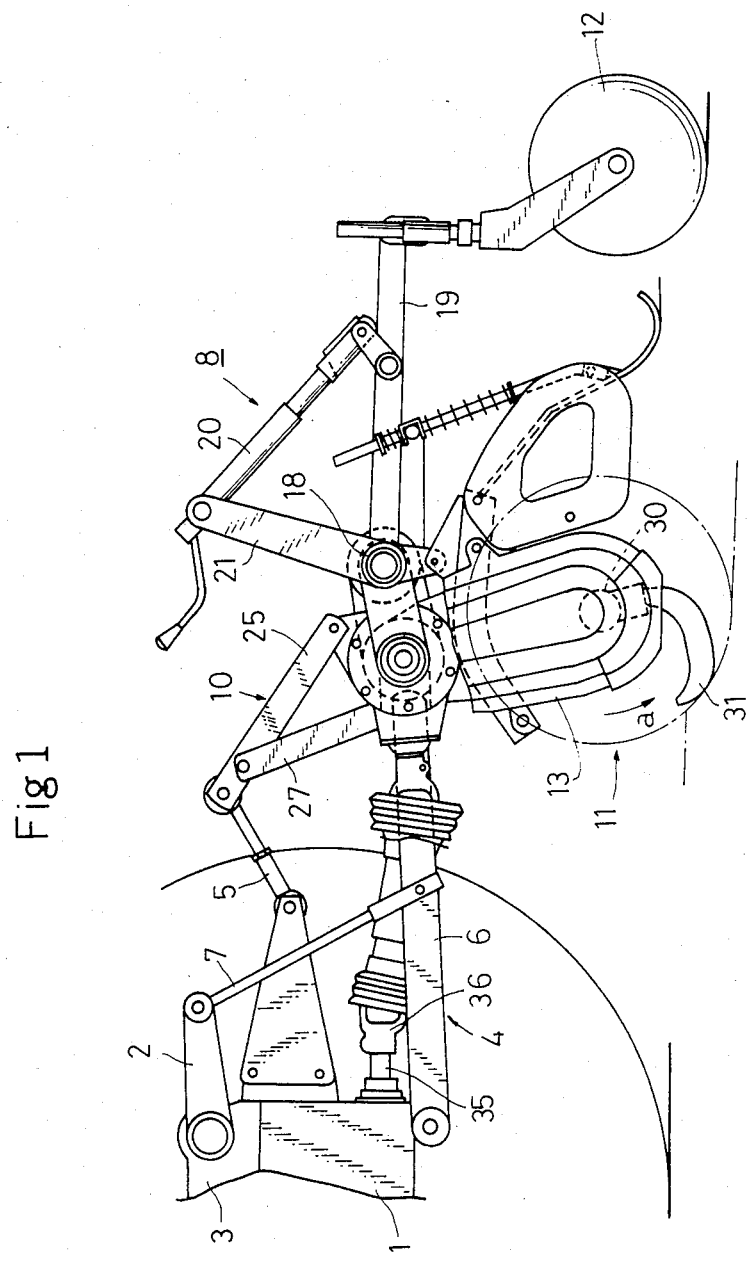

With reference to FIG. 1, a vehicle 1, which is illustrated as a tractor, carries a hydraulic unit 3 having a pair of opposite lift arms 2.

A three-point link assembly 4 comprises a top link 5 and a pair of opposite lower links 6 and extends from the vehicle 1. An intermediate portion of each lower link 6 is connected to the corresponding lift arm 2 by a lift rod 7.

A rotary cultivating apparatus 8 is connected to the three-point link assembly 5 and is liftable relative to the vehicle 1 by the hydraulic unit 3.

The cultivating apparatus 8 consists essentially of a tiller frame 9, a fixed frame 10, a rotary tiller unit 11, a tiller cover, a gauge wheel 12, etc.

Figure 2:
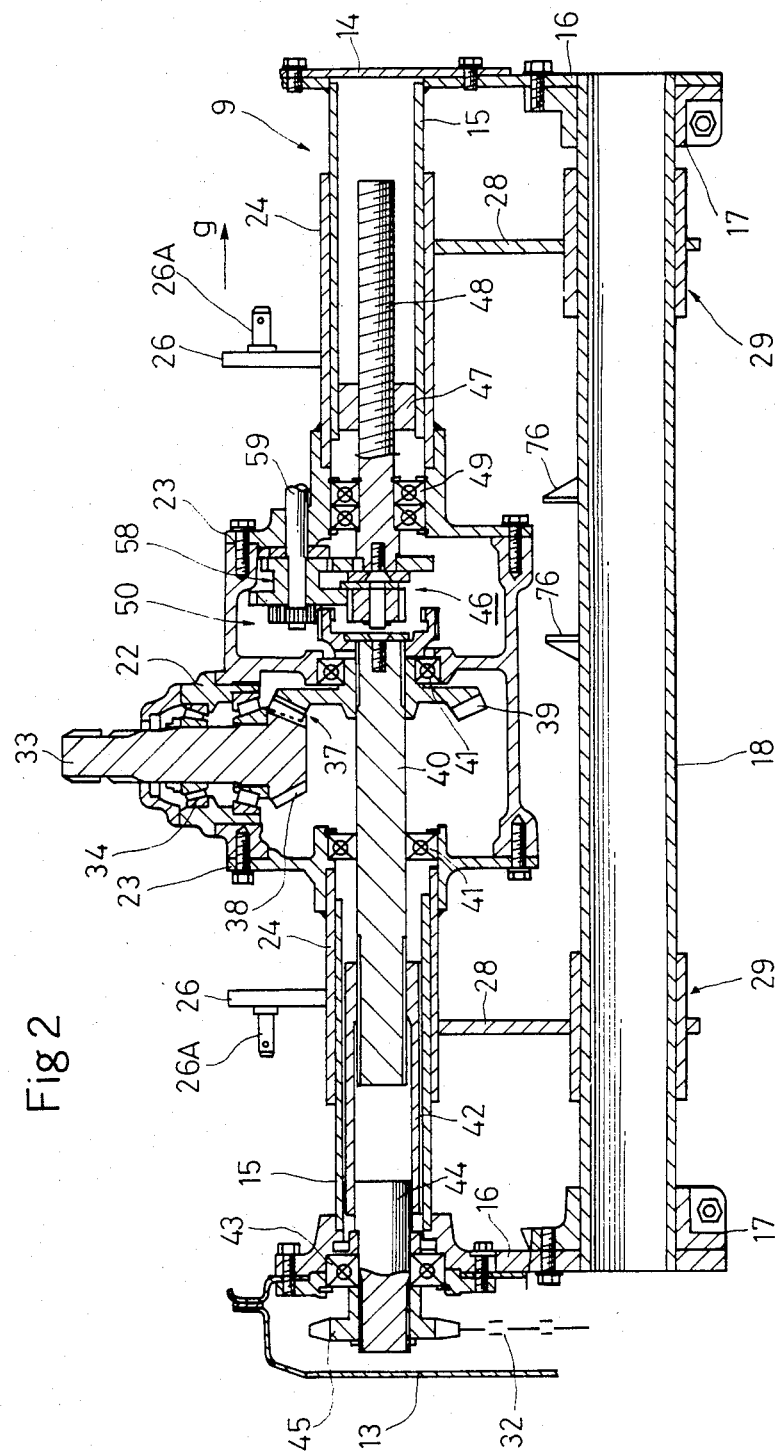
Figure 11:
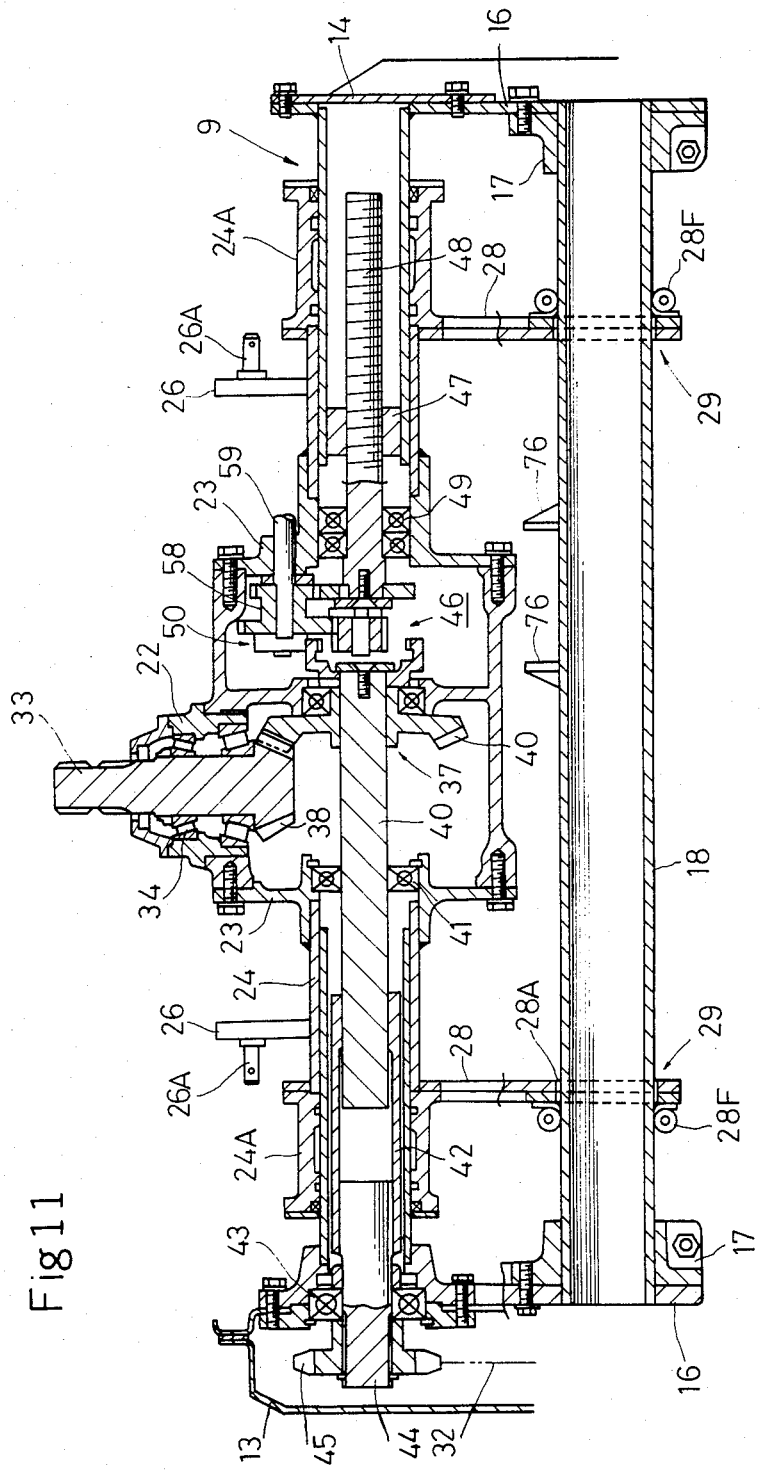
FIGS. 11 to 17 show a second embodiment of the invention.

With reference to FIG. 2, the tiller frame 9 comprises a transmission case 13 and a side frame 14 arranged at the opposite sides of the apparatus, a pair of tubular support members 15, 15 extending from the upper ends of the case 13 and the frame 14 toward each other, a cylindrical slide frame 18 supported by socket members 17, 17 and interconnecting the rear ends of brackets 16, 16 extending rearward from the outer ends of the support members 15, 15, etc. A frame 19 for supporting the gauge wheel 12 shown in FIG. 1 is upwardly and downwardly movably supported by the slide frame 18. A bracket 21 extending upward from the slide frame 18 is connected to the support frame 19 by cultivating depth adjusting means 20 comprising a hydraulic cylinder, screw-thread assembly or the like.

The fixed frame 10 comprises an input gear case 22, a pair of opposite tubular support members 24, 24 attached by cover members 23, 23 to the opposite sides of the gear case 22, a top mast 25 extending upward from the gear case 22, lower link connectors 26, 26 projecting forward from the support members 24, 24, support arms 27 connecting the connectors 26, 26 to the top mast 25, etc. The top link 5 and the lower links 6 are removably connected to the upper end of the top mast 25 and pins 26A on the connectors 26 respectively as shown in FIG. 1. The end and the pins thus serve as connecting portions.

Support arms 28 projecting rearward from the pair of tubular support members 24 of the fixed frame 10 are provided with sliding guide means 29, each of which is a tube or cylinder in the present embodiment.

The pair of tubular support members 15 of the tiller frame 9 are slidably inserted in the pair of tubular support members 24 of the fixed frame 10, while the slide frame 18 of the tiller frame 9 is inserted through the guide means 29, whereby the tiller frame 9 provided with the rotary tiller unit 11 and the gauge wheel 12 is made laterally shiftable relative to the fixed frame 10.

The rotary tiller unit 11 comprises a tine shaft 30 shown in FIG. 1 and supported by unillustrated bearings on the lower ends of the transmission case 13 and the side frame 14 to extend therebetween, and a multiplicity of cultivating tines 31 removably attached to the shaft 30 by brackets. The tine shaft 30 is substantially parallel to the slide frame 18 and is driven by chain transmission means 32 within the case 13 as seen in FIG. 2.

With reference to FIG. 2, a power input shaft 33 is supported by a bearing 34 on the input gear case 22 and positioned between the lower link connectors 26. The input shaft 33 can be coupled to a PTO shaft 35 of the vehicle 1 by a universal joint 36 as seen in FIG. 1.

Bevel gear means 37 housed in the input gear case 22 comprises a bevel pinion 38 which is formed on the input shaft 33 by cutting in the present case, and a bevel gear 39 meshing with the pinion 38. A first transmission shaft 40 is splined, keyed or otherwise attached to the bevel gear 39.

The first transmission shaft 40 is supported in a horizontal position by bearings 41 within the gear case 22 and coaxially extends into the tubular support members 24 and 15 on one side of the case. A splined tubular shaft 42 is axially slidably fitted around the outer end of the shaft 40. The spline shaft 42 is attached to the inner end of a second transmission shaft 44 supported on the transmission case 13 by a ball bearing 43. A sprocket wheel 45 of the chain transmission means 32 is fixedly mounted on the outer end of the second transmission shaft 44.

A mechanism 46 for laterally shifting the tiller frame 9 relative to the fixed frame 10 is housed in the input gear case 22 and in the support member 24 on the other side of the case 22 opposite to the transmission shafts 40, 44. The shifting mechanism 46 comprises an internally threaded member 47 fixed to the support member 15 and a shifting screw rod 48 extending therethrough in screw-thread engagement therewith and rotatable in a positive or reverse direction. The screw rod 48 is supported by ball bearings 49 and can be coupled to the first transmission shaft 40 by change means 50 disposed within the gear case 22 for changing the direction of rotation of the screw rod. As shown in FIGS. 3 and 4, the change means 50 comprises a transmission gear chamber 51 having an inner gear 51a and an outer gear 51b concentric therewith, an intermediate gears 52, 53 selectively meshable with the inner gear 51a and the outer gear 51b respectively from inside and outside. The gear member 51 is splined to the inner end of the first transmission shaft 40 and prevented from slipping off by a retaining plate 54. The intermediate gears 52, 53 are rotatably supported by pins 56, 57 on a generally V-shaped pivotal arm 55 and are at all times in mesh with a diametrically large gear 58a of a double gear 58. The pivotal arm 55 is fixed to a rotatable shaft 59 extending through the cover member 23 of the gear case 22. The double gear 58 is freely rotatably mounted on the rotatable shaft 59. The double gear 58 has, besides the larger gear 58a, a diametrically small gear 58b always meshing with a gear 60 fixedly mounted on the inner end of the screw rod 48. The outer end of the rotatable shaft 59 is fixedly provided with a lever 61.

Change control means 62 for the change means 50 includes a change lever 63 which is pivotably supported by a pivot 65 and a pivotal plate 66 on a support bracket 64 fixed to the input gear case 22 as shown also in FIG. 5.

The pivotal plate 66 has a coupling pin 67 engaging in a cutout portion of the lever 61. The support bracket 64 and the pivotal plate 66 are provided with a pin 68 and a cutout 69, respectively, for restraining the pivotal movement of the plate 66 relative to the bracket 64 and also with positioning means 70 for holding the change lever 63 in its neutral position. The positioning means 70 comprises a conical recessed portion 71 formed in the pivotal plate 66, a ball 72 retained on the support bracket 64, a spring 73 for biasing the ball 72 toward the recessed portion 71 and a holding case 74.

An engaging member 75 is provided on one side of the pivotal plate 66 opposite the change lever 63. The slide frame 18 has a pair of restraining members 76, 76, one of which comes into contact with the engaging member 75 to return the change means 50 to the neutral position when the rotary tiller frame 9 is slidingly moved to a limit position.

The operation of the foregoing apparatus will now be described. During cultivation in the usual manner, the change lever 63 is held in its neutral position by the positioning means 70. Accordingly the change means 50 is in the neutral state, with the intermediate gears 52, 53 held out of mesh with the inner gear 51a and the outer gear 51b of the transmission gear member 51 as shown in FIG. 4. At this time, the tiller frame 9 is of course positioned centrally of the fixed frame 10 with respect to the lateral direction, so that the cultivating apparatus 8 is in alignment with the vehicle 1.

For cultivation, power is delivered from the vehicle 1 to the input shaft 33 of the cultivating apparatus via the universal joint 36. The power is transmitted to the tine shaft 30 by way of the bevel pinion 38, bevel gear 39, first transmission shaft 40, spline shaft 42, second transmission shaft 44 and chain transmission means 32, whereby the rotary tiller unit 11 is rotated in the direction of arrow a in FIG. 1 to cultivate the field.

To shift the tiller frame 9 and the rotary tiller unit 11, for example, rightward in FIG. 2 for cultivating the soil close to a bordering ridge or the like, the cultivating apparatus is lifted, and the change lever 63 is moved about the pivot 65 from the solid-line position in FIG. 5 toward the direction of arrow b shown, whereby the lever 61 and the rotatable shaft 59 are rotated in the direction of arrow c in FIG. 4 through the pivotal plate 66 and the coupling pin 67 to rotate the pivotal arm 55 with the shaft 59 in the same direction. It is now assumed that the first transmission shaft 40 and the transmission gear member 51 are rotating in the direction of arrow d in FIG. 4. The above movement of the pivotal arm 55 meshes the intermediate gear 52 with the inner gear 51a of the gear member 51 as shown in FIG. 6, with the result that the gear 52 rotates in the direction of arrow e and the double gear 58 in the direction of arrow f. Through the smaller gear 58b and the gear 60, the screw rod 48 rotates in the direction of arrow d. Consequently, by virtue of the screw-threaded engagement between the screw rod 48 and the internally threaded member 47, the tiller frame 9 slidingly moves in the direction of arrow g in FIG. 2 relative to the fixed frame 10. When the tiller frame 9 has moved by a desired amount, the change means 50 is returned to the neutral state by the change lever 63, whereupon the tiller frame 9 is stopped and is locked to the fixed frame 10. The apparatus is then lowered for cultivation in this state. If the change lever 63 is retained in the shifted position, the restraining member 76 comes into contact with the engaging member 75 upon the tiller frame 9 reaching the limit position, to return the change means 50 to the neutral position. To return the tiller frame to the usual position after cultivating the soil close to the bordering ridge or to shift the tiller frame in the opposite direction, the change lever 63 is shifted in a direction opposite to the direction of arrow b in FIG. 5, and the intermediate gear 53 is engaged with the outer gear 51b of the transmission gear member 51 as shown in FIG. 7.

In this way, the tiller frame 9 having the rotary tiller unit 11 and the gauge wheel 12 can be shifted laterally relative to the fixed frame 10 by manipulating the change lever 63 of the change control means 62 and utilizing the power for driving the tine shaft.

FIGS. 8 to 10 show the positioning means in detail.

FIGS. 8 (1) to (3) show the intermediate gear 52 or 53 (53 is shown) as positioned in the neutral state relative to the transmission gear member 51. In this state, the ball 72 biased by the spring 73 is engaged in the recessed portion 71, holding the change lever 63 in its neutral position.

FIGS. 9 (1) to (3) show the parts when the intermediate gear 53 is about to mesh with the outer gear of the transmission gear member 51, with the change lever 63 moved in such a direction from the above position. If the lever 63 is released from the hand in this state, the ball 72 automatically engages in the recessed portion 71 under the action of the spring 73, returning the lever to the neutral position. Thus when the gear 53 is about to engage with the outer gear 51b, the center of the ball 72 is positioned at the edge defining the recess 71 to assure automatic return to the neutral position. Further when the ball 72 is completely out of engagement with the recessed portion 71, the intermediate gear 53 is completely in mesh with the outer gear 51b. Thus the arrangement eliminates the occurrence of repeated noises when one gear is brought into engagement wiwth the other gear.

FIGS. 11 to 17 show a second embodiment of the invention which is essentially similar to the first in that the power for driving the tine shaft is utilized for laterally shifting a tiller frame relative to the fixed frame. Accordingly like parts are referred to by like reference numerals, and the differences will be described below chiefly.

Figure 16:
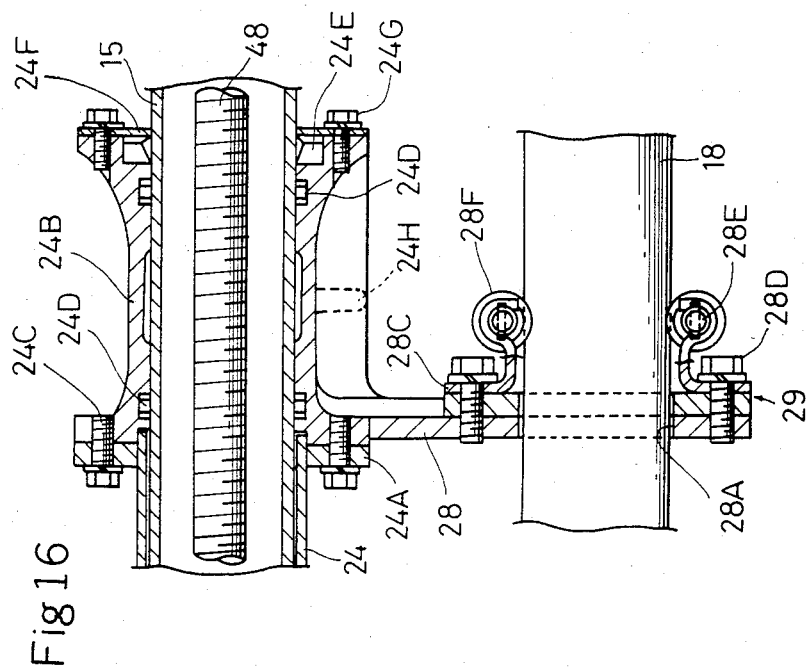
Figure 12:
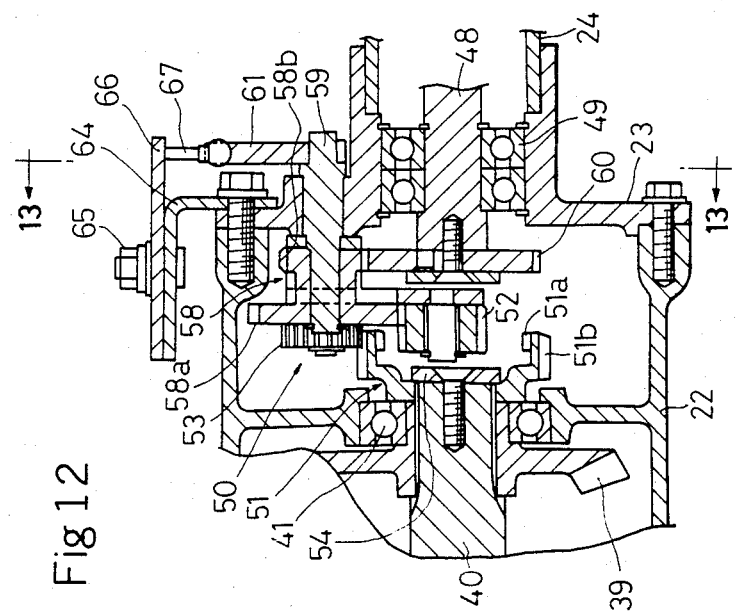
Figures 13, 14:
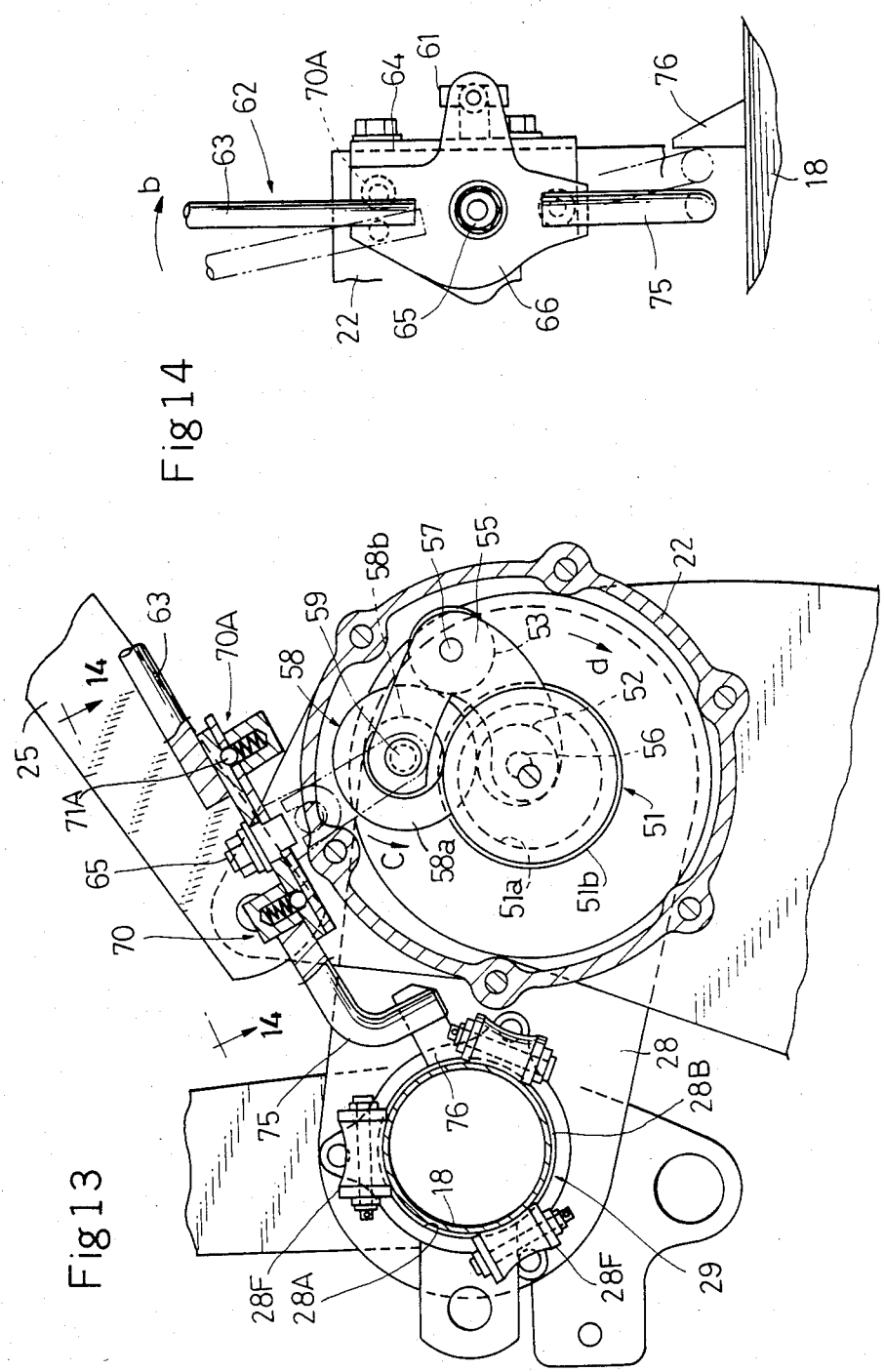

Each of tubular support members 24 extending from the gear case 22 is a short pipe which is fixedly provided with a flange 24A at its outer end (FIG. 16). Another tubular support member 24B, which is made of a metal material different from the one used for the flange 24A, is fixed to the flange 24A by bolts 24C. The tubular support member 15 of the movable tiller frame 9 is slidably inserted through the tubular support member 24B, with thrust bearings 24D provided on the inner periphery of the member 24B. Thus the tubular support members 24 and 24B, which are separate, are connected together in axial alignment. FIG. 16 further shows a seal 24E, a seal retainer 24F, bolts 24G, and a rib 24H.

A support arm 28 integral with or bolted to the inner end of the support member 24B extends toward the slide frame 18. The slide frame 18, which is in parallel with the tubular support members 15, 24, is inserted through a bore 28A formed in the free end of the support arm 28, with a clearance 28B provided around the slide frame 18.

Brackets 28C arranged equidistantly around the bore 28A are removably fixed to the arm 28 by bolts 28D. A rolling member 28F rotatably supported by a pin 28E on the bracket 28C has its outer periphery held in contact with the outer surface of the slide frame 18.

At least one of the bracket 28C and the rolling member 28F is made of resilient or elastic material. For example, the bracket 28C can be a bent piece of plate spring, while the rolling member 28F can be made from resin or synthetic rubber. Of course, both of them can be made from such a resilient or elastic material.

The rolling member 28F is in the form of a hand drum. Although three rolling members 28F are mounted on the arm 28 in bearing contact with the slide frame 18 in the present embodiment, a plurality of rolling members, e.g. two members one above the other, or four members may be used.

Figure 15:
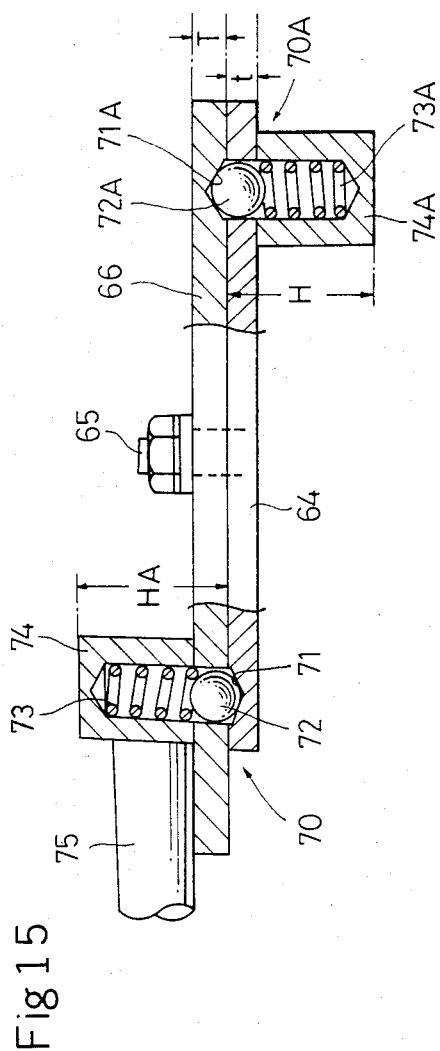
Figure 17:
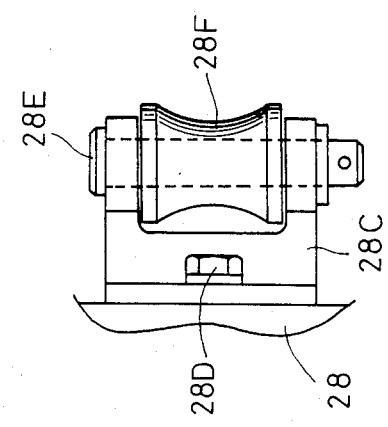

As seen in FIG. 15, the support bracket 64 of the change control means 62 has a thickness t which is smaller than the thickness T of the pivotal plate 66. These bracket and plate are provided with positioning means 70 for holding the change lever 63 in its neutral position, and positioning means 70A for holding the lever in each of positive rotation and reverse rotation positions.

With reference to FIG. 15, the positioning means 70 comprises a conical recessed portion 71 formed in the bracket 64, a ball 72 held on the pivotal plate 66, a spring 73 for biasing the ball 72 into the recessed portion and a spring holding case 74 fixed to the pivotal plate. The positioning means 70A comprises two conical recessed portions 71A formed in the pivotal plate 66, a ball 72A retained on the bracket 64, a spring 73 A for biasing the ball into the recessed portion 71A and a spring holding case 74A.

The recessed portions 71, 71A have the same depth, the balls 72, 72A have the same size, the spring 73, 73A have the same magnitude of force, and the cases 74, 74A have the same height, so that the force of the means 70 for holding the lever in the neutral position is lower than the force of the means 70A for holding the lever in the positive rotation and reverse rotation positions by the difference between the above-mentioned thicknesses.

Although the second embodiment shown in FIGS. 11 to 17 and the first embodiment have the same arrangement wherein the tiller frame 9 is easily moved relative to the fixed frame 10 by manipulating the change lever 63 and utilizing the power for driving the tine shaft, the second embodiment has the following advantages because the tubular support member on the fixed frame comprises divided segments and is provided with the improved sliding guide means.

The tiller frame 9 can be slidingly moved (shifted) relative to the fixed frame 10 more smoothly and properly because each tubular support member 24 is parallel to the slide frame, is short and is connected by bolts 24C to another tubular support member 24B to provide the length required for the sliding movement and to assure improved parallelism between the member 24 and the frame 18.

Further because the brackets 28C on the support arm 28 carry rolling members 28F in contact with the slide frame 18, the tiller frame 9 is slidable with reduced resistance and more rapidly and smoothly than otherwise.

Even if the gauge wheel 12 is subjected to impact during cultivation or upon engagement with the ground, the impact can be absorbed and mitigated by the elasticity of at least one of each bracket 28C and each rolling member 28F. The presence of the clearance 28B assures this with improved effectiveness. An abnormally great force can be eventually withstood by the rigidity of the bored portion 28A of each support arm.

What is claimed is:

1. A rotary cultivating apparatus of the laterally shiftable type comprising an input gear case and a power input shaft, a pair of tubular support members each extending laterally from opposite sides of the input gear case, said gear case and said support members having hitch connecting portions for attachment to a vehicle a tiller frame having a rotary tiller unit and being laterally shiftably supported by the support members a transmission shaft inserted in one of the support members for transmitting power from the input shaft to the rotary tiller unit; a laterally shifting mechanism mounted in the other support member for laterally shifting the tiller frame relative to the input gear case, the shifting mechanism including a reversibly rotatable shifting screw rod screwed in an internally threaded member disposed within the other support member and fixed to the tiller frame, drive means for coupling the shifting screw rod to the transmission shaft to rotate the screw rod in a positive or reverse direction selectively and control means for operating the drive means, the drive means including a transmission gear member having an inner gear and an outer gear and a pair of intermediate gears supported by a pivotal arm and selectively meshable with the inner gear and the outer gear respectively, the control means including a lever for selectively bringing one of the intermediate gears into meshing engagement with the gear meshable therewith.

2. An apparatus as defined in claim 1 wherein the transmission gear member is fixed to the transmission shaft, and the shifting screw rod is inserted in the other support member in alignment with the transmission shaft and has a gear fixedly mounted thereon, the intermediate gears being in mesh with a coupling gear, another coupling gear being movable with the coupling gear and meshing with the gear on the screw rod.

3. An apparatus as defined in claim 1 wherein the control means is provided with positioning means for holding the lever in a neutral position, a positive rotation position and a reverse rotation position, and the lever holding force of the positioning means is smaller in the neutral position than in the rotation positions.

4. An apparatus as defined in claim 1 wherein a horizontal slide frame is supported by upper portions of the tiller frame and inserted through sliding guide means extending from the tubular support members on the input gear case.

5. An apparatus as defined in claim 1 wherein each of the tubular support members extending from opposite sides of the input gear case comprises divided segments connected together in axial alignment.

6. An apparatus as defined in claim 4 wherein cultivating depth adjusting means and a gauge wheel are connected to the slide frame, and the gauge wheel is laterally shiftable with the rotary tiller unit.

7. An apparatus as defined in claim 4 wherein the slide frame is provided with a pair of opposite restraining members for returning the lever of the control means to its neutral position.

8. An apparatus as defined in claim 4 wherein the sliding guide means is mounted on a support arm extending from each of the tubular support members on the input gear case, and the sliding guide means comprises a plurality of rolling members each mounted by a bracket on the support arm and each having its outer periphery held in contact with the outer surface of the slide frame.

9. An apparatus as defined in claim 8 wherein at least one of the bracket and the rolling member is made of an elastic material, and the slide frame is inserted through a bore in the support arm with a clearance formed around the slide frame.

* * * * *